United States Patent [19]

Holleran et al.

[11] Patent Number: 4,458,831

[45] Date of Patent: Jul. 10, 1984

[54] VARIABLE FLOW DISPENSING DEVICE

[75] Inventors: Peter M. Holleran, Concord; Bruce H. Wisner, Malden, both of Mass.

[73] Assignee: W. R. Grace & Co., Cambridge, Mass.

[21] Appl. No.: 399,541

[22] Filed: Jul. 19, 1982

[51] Int. Cl.³ .............................................. B05B 7/12
[52] U.S. Cl. .................................. 222/134; 222/145; 137/862; 239/414; 239/527
[58] Field of Search ............... 222/134, 135, 145, 282; 137/862, 881; 239/407, 413, 414, 417.5, 527, 112

[56] References Cited

U.S. PATENT DOCUMENTS

| | | | |
|---|---|---|---|
| 3,096,001 | 7/1963 | Boe et al. | 222/135 |
| 3,366,337 | 1/1968 | Brooks et al. | 239/414 |
| 3,399,837 | 9/1968 | Frick | 239/415 |
| 3,633,795 | 1/1972 | Brooks | 222/134 |
| 3,633,828 | 1/1972 | Larson | 239/412 |
| 3,784,110 | 1/1974 | Brooks | 239/304 |
| 4,117,551 | 9/1978 | Brooks et al. | 366/162 |
| 4,169,545 | 10/1979 | Decker | 222/136 |
| 4,311,254 | 1/1982 | Harding | 222/145 |

Primary Examiner—Joseph J. Rolla
Assistant Examiner—Michael S. Huppert
Attorney, Agent, or Firm—John J. Wasatonic; William L. Baker

[57] ABSTRACT

A dispensing device for mixing and dispensing multi-component liquid mixtures is described. The dispensing device comprises valve assemblies including a tapered valve plug and a correspondingly tapered valve seat and, downstream from the valve assemblies, respective orifices which provide access to a mixing and dispensing nozzle. The cross-sectional area of the orifices is about $1.7 \times 10^{-4}$ to $2.0 \times 10^{-3}$ sq. in. and the ratio of the cross-sectional area of the valve opening at any level of operation to the cross-sectional area of its respective downstream orifice is less than about 3.0. The device generally is configured as a dispensing "gun" and provides a capability for controlled variation in the flow rate of the liquid components and mixing of the components at a consistent volume ratio.

9 Claims, 6 Drawing Figures

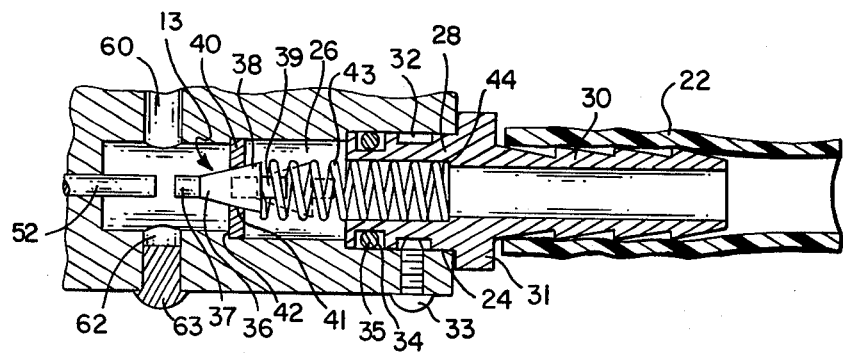
Fig. 4
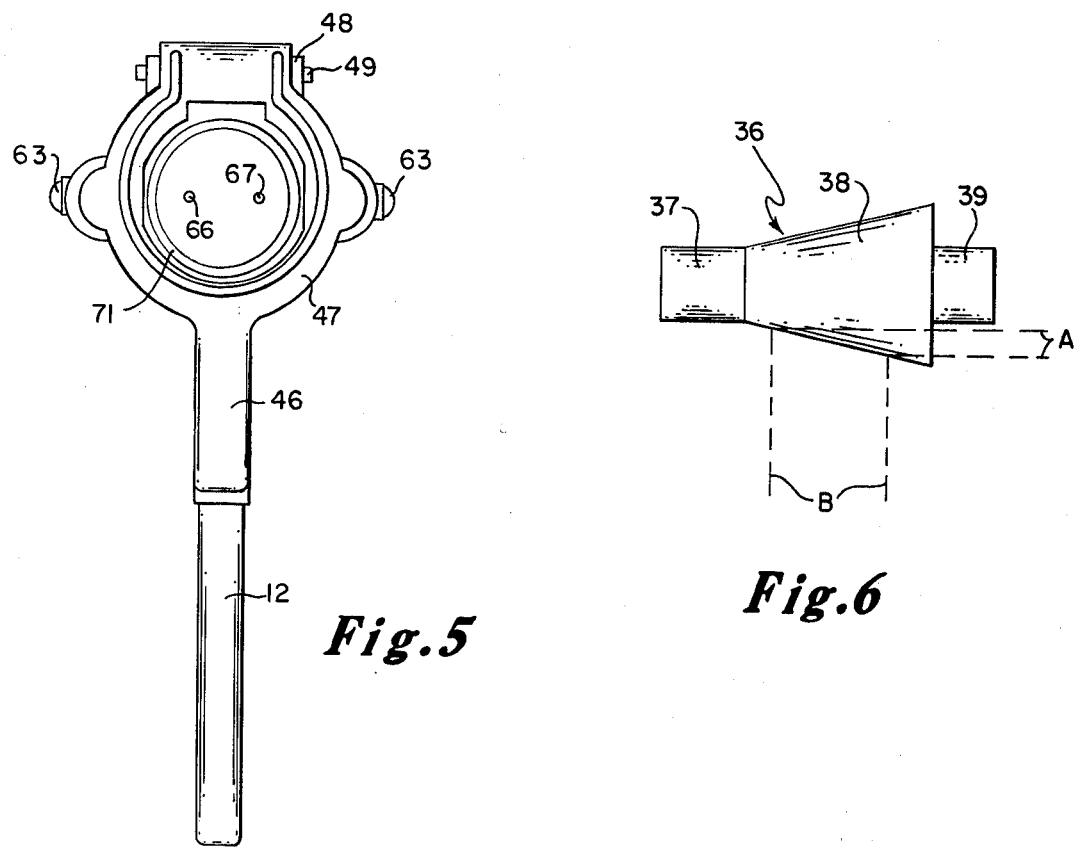
Fig. 5
Fig. 6

VARIABLE FLOW DISPENSING DEVICE

BACKGROUND OF THE INVENTION

This invention relates to dispensing devices for multi-component liquid mixtures. More specifically, this invention relates to guns for mixing reactive foam components or like fluid products in a controlled stoichiometric ratio and dispensing the resultant mixture at a controlled constant or variable flow rate.

Urethane foams are widely used in the construction and building trades. They are used, for example, as insulation materials, as support materials in walls, partitions, and the like, as underlayment supports for pipelines, and as waterproof insulating sealants for cracks and fissures.

In a common practice, the urethane foam is formed at the job site by mixing reactive liquid foam components and immediately thereafter applying the resultant reactive mixture to the intended substrate. As and after they are applied, the components of the mixture undergo reaction to produce the desired foam. The foaming which occurs upon reaction expands the applied reactive mixture so as to facilitate complete coverage of the substrate or complete filling of an open area which is to be filled or sealed. In general, the use of urethane foams provides a relatively convenient, effective, and inexpensive method of insulating, sealing, or filling a variety of substrate materials and structures.

Various devices have been proposed for mixing and dispensing the reactive foam components. These devices generally are in the form of "guns" which include manually activated valves which are intended to control the flow of the reactive components into a mixing chamber in the gun from which the resultant mixture is discharged. The respective components are initially retained under pressure in separate vessels which are connected by flexible tubing to inlet ports on the gun which, in turn, lead to the valve assembly. The mixing chamber is preferably detachable and disposable, inasmuch as residual material in the chamber can solidify and clog the chamber and its entry and exit ports.

Among features and functions which are desirable in such dispensing guns are (a) the ability to control the flow rate of the respective liquid components and, concomitantly, the rate at which the reactive mixture is dispensed, thereby permitting application of optimal amounts of the mixture and compensation for any decreasing head pressure as the components are dispensed from their respective pressurized vessels; (b) a capability in the gun for consistently and uniformly mixing the respective component streams at a desired volume ratio, thereby facilitating reaction of the components in a desired stoichiometric ratio; (c) light weight and favorable handling and operating characteristics, particularly in a manual operation of trigger assemblies for actuating the valves; and (d) ease and economy of manufacture. In general, the dispensing guns heretofore provided have proven to be unsatisfactory in one or more of the above respects.

SUMMARY OF THE INVENTION

It is, therefore, an object of this invention to provide an improved dispensing device for the mixing and dispensation of multi-component liquid mixtures.

It is another object of this invention to provide a dispensing device for multi-component liquid mixtures which readily permits variation in the flow rate at which the liquid components are mixed and dispensed.

It is another object to provide a dispensing gun for pressurized urethane foam components which provides a substantial and continual variation in the flow rate of the liquid components by manual deflection of a trigger assembly over a desirably low displacement distance.

It is a further object of this invention to provide a dispensing gun for pressurized urethane foam components which can be produced economically and which provides reproducible and consistent mixing, from one gun to the next, of the respective components at a desired volume ratio.

These and other objects are achieved by including in the dispensing devices of this invention a combination of (a) a valve assembly comprising a valve plug comprising a constant diameter cylindrical section and a rearwardly diverging tapered section which diverges outward from the cylindrical section and a valve seat comprising a rearwardly diverging tapered bore having the same taper as the tapered section of the valve plug, in which the valve plug is slidably positioned for axial movement of at least a portion of the cylindrical section and at least a portion of the tapered section within the valve seat; and (b) orifices providing access to a mixing and dispensing nozzle, each orifice being positioned downstream from a respective valve assembly and having a cross-sectional area of about $1.7 \times 10^{-4}$ to about $2.0 \times 10^{-3}$ sq. in. Furthermore, it is provided that the ratio of the cross-sectional area of the valve opening at any given level of operation to the cross-sectional area of its respective downstream orifice is less than about 3.0. The taper of the tapered section of the valve plug is about 0.5/12 to about 4/12 and, preferably, the ratio of the cross-sectional area of the valve opening to that of its respective downstream orifice is in the range of about 0.5 to about 1.5.

In accordance with this invention, it has been found that the utilization of the tapered valve assemblies in combination with respective downstream orifices, within the dimensional ranges provided herein, provides a capability for controllable, continual variation in the flow rate, controlled restricted flow at full valve opening, and effective mixing of the components at a consistent volume ratio. Particularly with respect to the latter feature, the present invention reduces the criticality of the orifice size in controlling the quantitative flow of the components into the mixing chamber and, thus, permits relatively inexpensive fabrication of dispensing guns which provide, from one gun to the next, consistent mixing of the liquid components at a desired volume ratio.

The present invention is more fully described in the following detailed description taken in connection with the accompanying drawings.

BRIEF DESCRIPTION OF THE DRAWINGS

FIG. 4 is an enlarged, sectional view of a coupling connector and valve assembly of the gun;

FIG. 5 is an elevated, frontal view of the dispensing gun with the dispensing nozzle removed; and FIG. 6 is a side view of a valve plug used in the present invention and showing measurement of the taper of the plug.

In the drawings, like numerals refer to like parts.

DETAILED DESCRIPTION OF THE INVENTION

Figure 1:
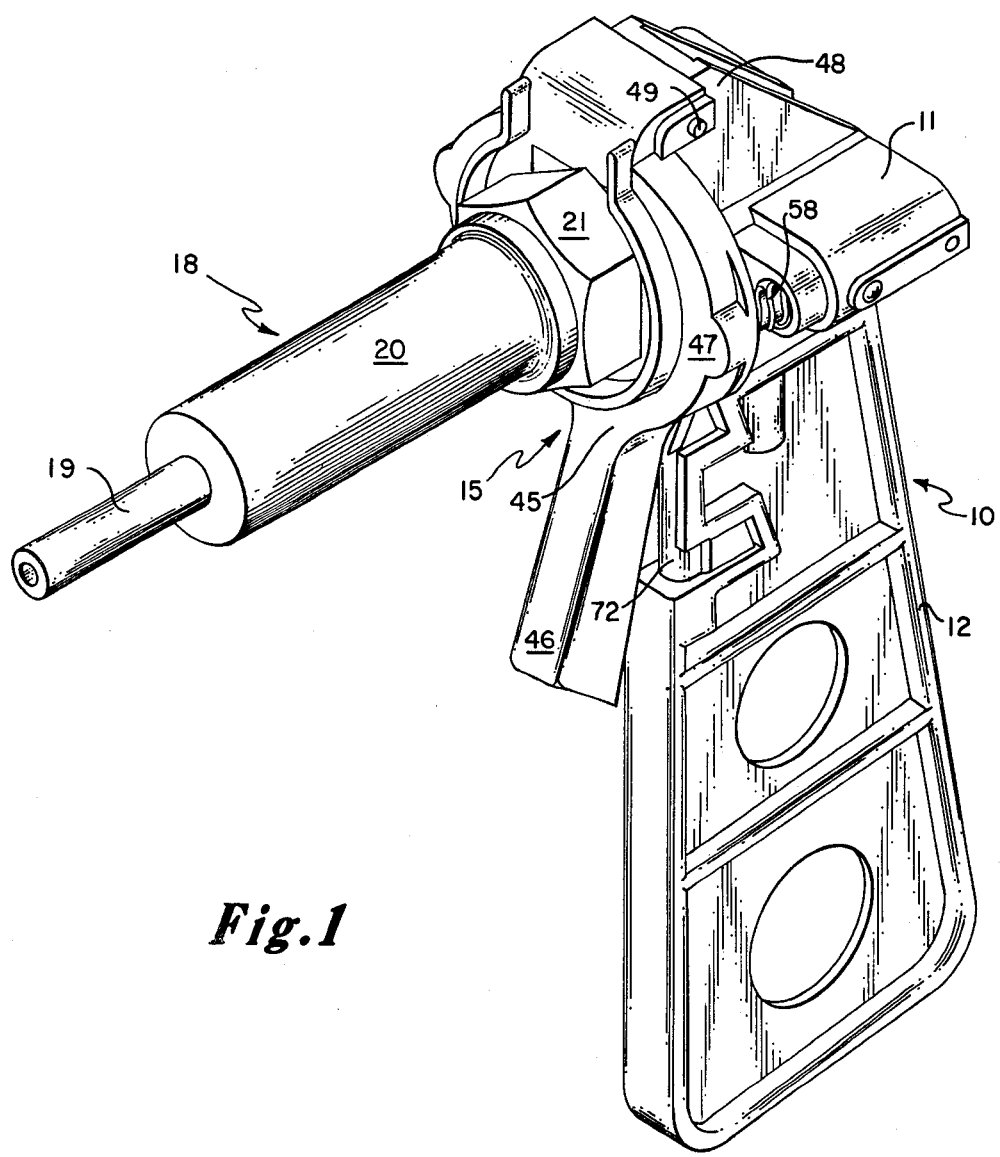
FIG. 1 is an elevated perspective view showing a preferred dispensing gun of this invention.

The invention is more fully described hereinafter by reference to the preferred embodiment illustrated in the drawings. It should be understood, however, that the invention is not limited to such embodiment but is intended to include all modifications and equivalents within the scope and comprehension of the invention.

Figure 2:
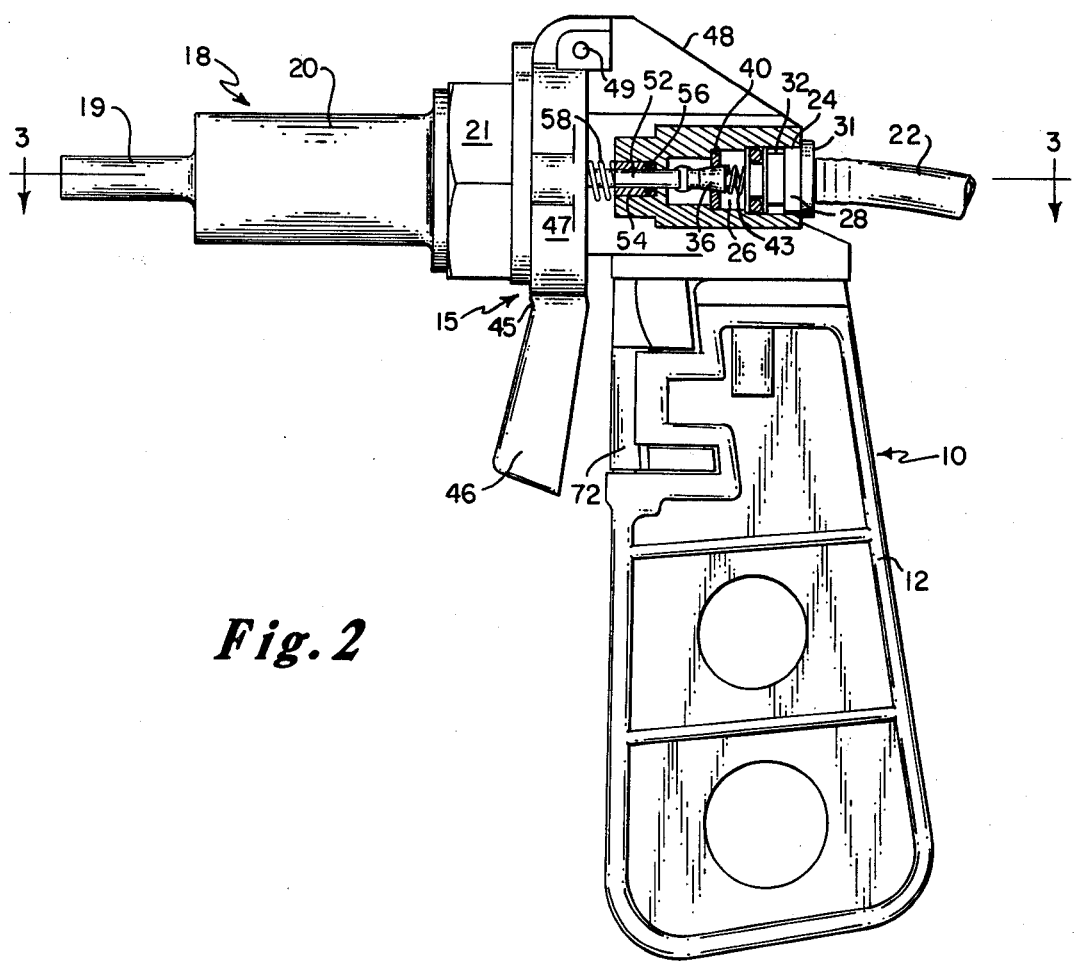
FIG. 2 is a partially cut-away, side elevational view of the dispensing gun of FIG. 1.
Figure 3:
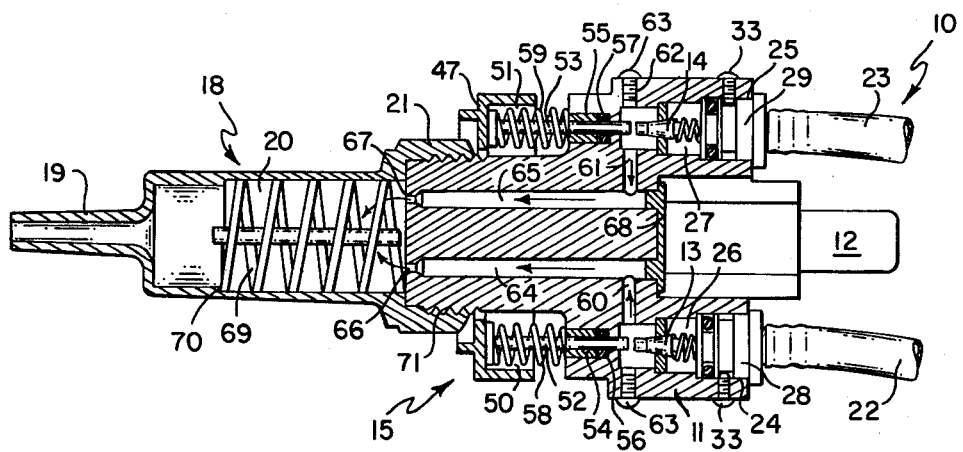
FIG. 3 is a sectional view taken substantially in the line of plane 3—3 in FIG. 2 showing the valve assembly, fluid passages, mixing chamber, and related structure of the dispensing gun.

Referring to the drawings, there are illustrated in FIGS. 1–3 different views of a preferred dispensing gun of this invention. The dispensing gun 10 includes a housing 11, a handle 12 affixed to housing 11 and having a size and configuration which facilitates handling of the gun, valve assemblies 13 and 14 which modulate fluid flow in the gun, a trigger mechanism 15 which actuates valve assemblies 13 and 14, and a mixing and dispensing nozzle 18 which includes a cylindrical exit tube 19, a mixing chamber 20, and an internally threaded rear mounting 21 which is externally configured to provide wrench flats in hexagonal or other convenient arrangement.

The respective fluid components which are to be mixed and dispensed are initially retained under pressure in separate vessels (not shown) and are brought to the gun through flexible hoses 22 and 23, respectively. As shown in FIGS. 2 and 3, hoses 22 and 23 are connected to housing 11 at rear inlets 24 and 25 of bores 26 and 27 by hose coupling connectors 28 and 29, respectively. As illustrated by specific enumeration of connector 28 (FIG. 4), each of connectors 28 and 29 is provided with a rearward projecting circumferentially barbed or serrated nipple 30 which is closely insertable in hose 22, the barbs or serrations serving to securely engage the nipple with the inner surface of the hose; a stepped positioning flange 31 which is partially insertable in bore 26 and thus limits the extent to which connector 28 may be inserted in the bore; a groove 32 which is engaged by lock screw 33 to secure coupling connector 28 in housing 11; and a forward groove 34 which is fitted with o-ring 35 to prevent fluid leakage.

The entry and rate of flow of the fluid components into and through the gun 10 are controlled by valve assemblies 13 and 14 mounted in bores 26 and 27, respectively. As illustrated by enumeration of valve assembly 13 in FIG. 4, each of valve assemblies 13 and 14 includes a valve plug 36 having a leading cylindrical section 37, a rearwardly diverging tapered section 38 having a taper defined by A/B (FIG. 6), and a rear stem 39. Valve assembly 13 also includes a valve seat 40 having a central rearwardly diverging circular bore 41. Valve seat 40 is mounted within bore 26 at annular ledge 42. Urging valve plug 36 into bore 41 (closed position) is a biasing spring 43 which wraps around rear stem 39 and extends into coupling connector 28 wherein it is circumferentially supported by annular ledge 44, shown as part of the interior wall of connector 28.

Valve assemblies 13 and 14 are simultaneously and equally actuated by trigger mechanism 15. A trigger member 45 consists of a trigger projection 46 depending from a circular yoke 47 which encircles housing 11 and is pivotally mounted thereto at upper housing flange 48 by a hinge pin 49, and recesses 50 and 51 at which trigger member 45 engages push rods 52 and 53. Push rods 52 and 53 are slidably mounted in housing 11 by extending through bushings 54 and 55, respectively, and into bores 26 and 27, respectively. To prevent leakage of the pressurized fluid components past push rods 52 and 53 and through bushings 54 and 55, o-rings 56 and 57 are provided at the rear of the bushings 54 and 55, respectively.

Push rods 52 and 53 are positioned to simultaneously engage the front surfaces of valve plugs 36 when moved rearward by deflection of trigger member 45, thus unseating the valve plugs to an equal degree and initiating fluid flow. Compression springs 58 and 59 are provided to urge push rods 52 and 53 to their forward (closed) position when the pressure on trigger member 45 is relaxed. Release of trigger member 45 permits biasing springs 43 to reseat valve plug 36 and terminate fluid flow.

Valve assemblies 13 and 14 provide access to downstream passages 60 and 61 respectively. Passages 60 and 61 are conveniently provided in housing 11 by drilling out the housing through work recesses 62. The recesses 62 and then capped, e.g., by screws 63.

Passages 60 and 61 lead to axial passages 64 and 65, respectively, which terminate in circular orifices 66 and 67. Axial passages 64 and 65 can be formed by a drilling procedure but are preferably provided during the fabrication of housing 11 by molding procedures which will be apparent to those skilled in the art. A cap plate 68 seals off the rear of passages 64 and 65. Orifices 66 and 67 have a diameter in the range of about $1.7 \times 10^{-4}$ to $2.0 \times 10^{-3}$ sq. in. and effectively serve as entry ports into mixing chamber 20.

As shown by FIG. 3, mixing chamber 20 is a cylindrical cavity equipped with a helical baffle 69 which promotes mixing of the respective liquid components. Baffle 69 is retained at the rearward section of chamber 20 by annular ledge 70. After mixing, the reactive component mixture is discharged through cylindrical exit tube 19. The nozzle 18 is provided as an integral member including exit tube 19, mixing chamber 20, and rear mounting 21 which is internally threaded. Helical baffle 69 is separately inserted in mixing chamber 20 prior to use.

As shown particularly by FIG. 3, gun housing 11 is provided with a threaded front projection 71 and rear mounting 21 is screwed onto projection 71 to mount nozzle 18. Nozzle 18 is thus removable from housing 11 and can be replaced if it should become clogged by solidification of the reactive mixture therein, e.g., when the application process is interrupted for a relatively long duration. Orifices 66 and 67 are best seen as situated at the front face of threaded projection 71 by reference to FIG. 5.

With reference to FIG. 2, a lock guard 72 is pivotally mounted at the upper front portion of handle 12. The lock guard can be pivoted out of the handle, essentially 180°, to prevent inadvertant deflection of trigger member 45.

The taper A/B of valve plug section 38 (FIG. 6) is essentially the same as the taper of valve seat bore 41. As shown in FIGS. 2–4, in the closed valve position a portion of tapered section 38 is tightly engaged against the full inside surface of bore 41 to provide a fluid-tight seal.

In accordance with this invention, it is provided that the taper A/B of valve plug section 38 is in the range of about 0.5/12 to about 4/12. Most preferably the taper is about 2/12. It has been found that a taper within the stated range provides optimal control of the flow rate and a relatively wide range of flow rates with a relatively low level of displacement of push rods 52 and 53 of approximately ¼ inch. This translates into a correspondingly low level of displacement of trigger member 45 which, in turn, facilitates manual operation of the gun.

The employment of valve assemblies 13 and 14, having the configuration shown and a taper within the stated range, provides a substantial capability for controlled, continuous variation over a useful and relatively wide range of flow rates. The valve plug 36 can have a sufficiently small maximum diameter, most preferably in the range of about 0.10 to about 0.20 inch, such that the threshold pressure on the trigger which is necessary to actuate the valve against the opposing hydraulic pressure of the fluid components is sufficiently low to permit gradual displacement over the full trigger displacement range. The gradual rearward displacement of the tapered section 38 provides a continual enlargement of the valve opening so as to provide an especially desirable and satisfactory modulation of the flow rate through the valve assembly. The capability to so modulate the flow rate allows a more economical and optimal application of foam, in terms of the quantitative requirements of different target substrates. Moreover, the capability to gradually increase the flow rate allows the operator to better achieve a constant flow rate where the fluid components are retained in internally pressurized, closed vessels in which the head pressure decreases as the fluid components are dispensed.

As the trigger is more fully deflected the cylindrical section 37 gradually enters bore 41 and the rate of flow increase is lessened. At full deflection, only the cylindrical section 37 is positioned within bore 41, as shown by broken outline in FIG. 4. The presence of section 37 within the bore 41 restricts the flow at full trigger deflection and maintains the cross-sectional area of the opening at a desirably low level with respect to the cross-sectional area of orifices 66 and 67. As further discussed hereinafter, optimal flow control and mixing of the liquid components is facilitated by limiting the ratio of the cross-sectional area of the valve opening to the cross-sectional area of the downstream orifice to below about 3.0.

It is an important feature of this invention that orifices having a cross-sectional area within the range set forth herein are provided downstream from the valve assemblies and provide access to a mixing chamber. Most preferably, as depicted by FIG. 2, the orifices are effectively the entry ports for the mixing chamber. The orifices can have any suitable shape. Constant diameter, circular orifices are preferred.

The small size orifices serve to increase the velocity of the fluid streams as they enter the mixing chamber and also function to disperse the streams into a spray pattern of fine droplets, thereby promoting efficient and uniform mixing and dispensing of the reactive components. The small size of the orifices is also desired in order to minimize any tendency for backflow of the reactive mixture, i.e., into passages 64 and 65, and resultant clogging of non-replaceable sections of the gun assembly.

The small size orifices provide a measure of flow restriction and, as a result, tend to meter or determine the volume quantity entering the mixing chamber. Thus, where the orifices are the principal means of flow restriction they are likewise the principal determinant of the volume ratio at which the reactive components are introduced and mixed in the mixing chamber. This is undesirable in that relatively small variations in orifice size can cause substantial variance in the volume ratio. While this disadvantage can be alleviated by reproducibly providing the orifices at a fine tolerance, such practice is generally not compatible with the manufacture of inexpensive devices, generally of molded plastic, which are intended for disposal after one or a few uses.

In accordance with this invention, it has been found that if the ratio of the cross-sectional area of the valve opening at any level of operation to the cross-sectional area of its respective downstream orifice is less than about 3.0, the valve assembly, not the orifice size, is the principal means of flow restriction. Accordingly, the criticality of orifice size as a determinant of the volume ratio at which the fluid components are mixed is substantially reduced and the orifices can be provided within a wider tolerance range without substantial effect on the volume ratio. This, in turn, provides for greater reproducibility and consistency, from one gun to the next, in the volume ratio at which the components are mixed, notwithstanding small variations in orifice size. Moreover, the wider tolerance range facilitates less expensive fabrication and, in particular, has been found to permit satisfactory fabrication by conventional and economic plastic molding techniques.

Most preferably, the ratio of the cross-sectional area of the valve opening to that of its downstream orifice is less than about 1.5. However the ratio should be at least about 0.5 in order to provide an acceptable level of fluid flow and permit the orifices to perform their intended function of providing a high velocity, well-dispersed stream into the mixing chamber.

Various changes, substitutions, and modifications can be made in the embodiments discussed and illustrated herein without departing from the spirit and scope of the invention. Accordingly, what is shown in the drawings and description hereof is intended as illustrative and not limitative.

What is claimed is:

1. A dispensing device for mixing and dispensing a multi-component fluid mixture comprising:
   housing means having inlets for introduction of separate streams of the fluid components of said mixture into said housing means and passages for the separate flow of said components through said housing means;
   valve means positioned within said housing means downstream from each of said inlets;
   means for actuating said valve means;
   orifices positioned downstream from each of said valve means, said orifices having a cross-sectional area of about $1.7 \times 10^{-4}$ to about $2.0 \times 10^{-3}$ sq. in.; and
   a nozzle accessed by said orifices and adapted for mixing and dispensing said fluid components;
   wherein said valve means can be actuated to provide a controlled variable and constant rate of flow of said fluid components through said passages; and
   said valve means comprise a valve plug comprising a cylindrical section and a rearwardly diverging tapered section diverging outward from said cylindrical section and a valve seat comprising a rearwardly diverging tapered bore having essentially the same taper as said tapered section of said valve plug, said valve plug being slidably positioned for axial movement of said tapered section and said cylindrical section in said tapered bore, said tapered section having a taper in the range of about 0.5/12 to about 4/12; and wherein the ratio of the cross-sectional area of the opening in said valve means at any level of actuation to the cross-sectional area of its respective downstream orifice is less than about 3.0.

2. A device of claim 1 wherein said taper is about 2/12.

3. A device of claim 1 wherein the ratio of the cross-sectional area of the opening in said valve means to the cross-sectional area of its respective downstream orifice is less than about 1.5.

4. A device of claim 1 wherein said nozzle is removably mounted on said housing.

5. A dispensing gun for mixing and dispensing a two fluid component urethane foam composition, said fluid components being retained under pressure in separate vessels remote from said gun, said gun comprising:

a gun housing having a pair of inlets for the introduction of separate streams of said fluid components into said housing and passages for the separate flow of said components through said housing;

a pair of valve assemblies positioned in said housing downstream from, respectively, each of said inlets;

manually operated trigger means for actuating said valve assemblies simultaneously and equally;

an orifice at the downstream terminus of each of said passages, said orifices having a cross-sectional area of about $1.7 \times 10^{-4}$ to about $2.0 \times 10^{-3}$ sq. in.; and a mixing and dispensing nozzle accessed by said orifices and comprising a mixing chamber;

wherein said valve assemblies can be actuated to provide a controlled variable and constant rate of flow of said fluid components through passages; and said valve assemblies each comprise a valve plug comprising a cylindrical section and a rearwardly diverging tapered section diverging outward from said cylindrical section and a valve seat comprising a rearwardly diverging tapered bore having essentially the same taper as said tapered section of said valve plug, said valve plug being slidably positioned for axial movement of said tapered section and said cylindrical section in said tapered bore, said tapered section having a taper in the range of about 0.5/12 to about 4/12; and wherein the ratio of the cross-sectional area of the opening in each of said valve assemblies at any level of actutation to the cross-sectional area of each of the respective said downstream orifices is less than about 3.0.

6. A gun of claim 5 wherein said taper is about 2/12.

7. A gun of claim 5 wherein the ratio of the cross-sectional area of the opening in said valve means to the cross-sectional area of its respective downstream orifice is less than about 1.5.

8. A gun of claim 5 wherein said nozzle is removably mounted on said housing.

9. A gun of claim 5 wherein said valve plug has a maximum diameter in the range of about 0.10 to about 0.20 inch.

* * * * *